US012047263B2

(12) United States Patent
Cociglio

(10) Patent No.: US 12,047,263 B2
(45) Date of Patent: Jul. 23, 2024

(54) PACKET LOSS MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 17/905,305

(22) PCT Filed: Mar. 2, 2021

(86) PCT No.: PCT/EP2021/055200
§ 371 (c)(1),
(2) Date: Aug. 30, 2022

(87) PCT Pub. No.: WO2021/175861
PCT Pub. Date: Sep. 10, 2021

(65) Prior Publication Data
US 2023/0087379 A1    Mar. 23, 2023

(30) Foreign Application Priority Data
Mar. 4, 2020   (IT) ......................... 102020000004624

(51) Int. Cl.
*H04L 43/0829*    (2022.01)
(52) U.S. Cl.
CPC ................. *H04L 43/0829* (2013.01)
(58) Field of Classification Search
CPC ... H04L 43/0829; H04L 43/02; H04L 43/062; H04L 43/0852; H04L 43/0841; H04L 1/203
See application file for complete search history.

(56) References Cited

U.S. PATENT DOCUMENTS 7,185,114 B1 *  2/2007  Hariharasubrahmanian ................ H04L 1/1671
711/100
10,389,643 B1 *  8/2019  Matthews ............... H04L 47/32
(Continued)

FOREIGN PATENT DOCUMENTS

| EP | 3 005 622 B1 | 9/2018 |
| WO | WO 2010/072251 A1 | 7/2010 |
| WO | WO 2019/206862 A1 | 10/2019 |

OTHER PUBLICATIONS

International Search Report issued May 3, 2021, in PCT/EP2021/055200, 24 therein, 3 pages.
(Continued)

*Primary Examiner* — Philip J Chea
*Assistant Examiner* — James Ross Hollister
(74) *Attorney, Agent, or Firm* — Oblon, McClelland, Maier & Neustadt, L.L.P.

(57) ABSTRACT

A method for exchanging packets between two nodes of a packet-switched communication network. Each packet comprises a marking field and a reflected marking field. Each node sets the value of the marking field in its outgoing packets to be transmitted to the other node. This value is alternately switched between two alternative marking values every N outgoing packets. While incoming packets are received from the other node, each node also sets the value of the reflected marking field of its outgoing packets according to the value of the marking field of the incoming packets. An observer placed between the two nodes may count the packets whose marking field is equal to any of the marking values and/or the packets whose reflected marking field is equal to any of the marking values, and use N and such counts to provide a packet loss measurement.

14 Claims, 5 Drawing Sheets

(56) References Cited

U.S. PATENT DOCUMENTS

| | | | | |
|---|---|---|---|---|
| 2004/0114576 A1* | 6/2004 | Itoh | ..................... | H04L 65/764 |
| | | | | 370/352 |
| 2014/0036689 A1* | 2/2014 | Zheng | ................. | H04L 43/0888 |
| | | | | 370/241.1 |
| 2016/0105353 A1* | 4/2016 | Cociglio | ................. | H04L 43/50 |
| | | | | 370/252 |
| 2017/0244623 A1* | 8/2017 | Cociglio | ............. | H04L 43/0852 |

OTHER PUBLICATIONS

Fioccola G. et al. "Alternate-Marking Method for Passive and Hybrid Performance Monitoring; rfc8321.txt", Alternate-Marking Method for Passive And Hybrid Performance Monitoring; rfc8321.txt, Internet Engineering Task Force, IETF; Standard, Internet Society (ISOC) 4, XP015125343, Jan. 30, 2018, pp. 1-33.

M. Cociglio et al., "Client-Server Spin bit enabled Performance Measurements draft-cfb-ippm-spinbit-measurements-00", IPPM, Mar. 2020, 22 pages.

Alexandre Ferrieux et al., "Packet Loss Signaling for Encrypted Protocols", draft-ferrieuxhamchaoui-tsvwg-lossbits, Jan. 2020, 24 pages.

Mauro Cociglio et al., "New Spin bit enabled measurements with one or two more bits", Draft-cfb-ippm-spinbit-new-measurements-01, Montreal, Jul. 2019, IETF 105—IPPM WG, 18 pages.

* cited by examiner

PACKET LOSS MEASUREMENT IN A PACKET-SWITCHED COMMUNICATION NETWORK

TECHNICAL FIELD

The present invention relates to the field of communication networks. In particular, the present invention relates to a method for exchanging packets in a packet-switched communication network, a method for performing packet loss measurements and to a packet-switched network configured to implement such methods.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

When a communication service (in particular, a real-time voice or data service such as call, conference call, video conference, etc.) is provided by means of a packet-switched network, a performance measurement in terms of packet loss on packet flows carrying the service provides an indication of the quality of service (QoS) perceived by the end users of the service. In addition, packet loss may require retransmission and then reduce the efficiency of the communication network. Therefore, measuring packet loss of packet flows in a communication network is of particular interest for network operators.

As known, QUIC (Quick UDP Internet Connections) is a transport layer (layer 4) network protocol designed to support multiplexed connections between two endpoints (client and server) over User Datagram Protocol (UDP). In order to enable detection of possible packet losses by the endpoints, the QUIC protocol provides for transmission of an acknowledgement each time an endpoint receives a packet from the other endpoint. When a packet is transmitted and no acknowledgment is received within a predefined time threshold, the transmitted packet is declared lost.

Techniques enabling packet loss measurements by an intermediate observer located between the two endpoints have also been proposed.

M. Cociglio et al.: Internet Draft "New Spin bit enabled measurements with one or two more bits draft-cfb-ippm-spinbit-new-measurements-01", Jul. 1, 2019 describes a round-trip packet loss measurement whereby the client generates a train of marked packets having a dedicated header bit (also called Loss bit) set to 1. The server reflects the train of marked packets, which is then reflected again by the client and then by the server. Hence, the train of marked packets travels back and forth twice between client and server. An observer located between client and server detects twice the train of marked packets transmitted in a same direction and, based on the number of marked packets at each passage of the train, calculates a round-trip packet loss.

A. Ferrieux et al.: Internet Draft "Packet Loss Signaling for Encrypted Protocols draft-ferrieuxhamchaoui-quic-loss-bits-03", Jan. 16, 2020 describes an extension of the QUIC protocol introducing two bits in the packet header, namely a Q bit (sQuared signal bit) and an L bit (Loss event bit). Each endpoint sets the value of the Q bit in each outgoing packet. The value of the Q bit is switched every N outgoing packets (N typically being 64). Each endpoint also implements an Unreported loss counter which is increased by 1 each time a packet is declared lost using QUIC's existing loss detection machinery. The L bit of an outgoing packet is set to 1 if the counter is positive, otherwise it is set to 0. The counter is decremented each time a packet with L bit equal to 1 is transmitted. An observer located between the two endpoints counts the packets with Q bit equal to 1 or 0 and/or with L bit equal to 1 or 0 and, based on such numbers, provides different types of one-way packet loss measurements, including end-to-end measurements (namely, packet loss from transmitting endpoint to receiving endpoint), upstream measurements (namely, packet loss from transmitting endpoint to observer) and downstream measurement (namely, packet loss from observer to receiving endpoint).

SUMMARY OF THE INVENTION

The Applicant has perceived the need to provide an improved technique for enabling an intermediate observer to provide packet loss measurements, including one-way measurements such as end-to-end measurements, upstream measurements and downstream measurements.

According to the technique described by A. Ferrieux et al., indeed, the value of the L bit set in the outgoing packets by each endpoint depends on the QUIC mechanism whereby the endpoint itself declares a transmitted packet lost, which in turn depends from whether the endpoint receives from the other endpoint an acknowledgement within the predefined time threshold.

Lack of reception of the acknowledgement however does not necessarily imply that the transmitted packet was actually lost. For instance, the acknowledgement itself may be lost, or due to a congestion it may be received at the endpoint after the time threshold is expired. In all these situations, the endpoint which transmitted the packet declares the packet lost, increases the Unreported loss counter and then sets the L bit of an outgoing packet to 1. The number of outgoing packets with L bit equal to 1 may then be not indicative of the number of transmitted packets which were actually lost. Packet loss measurements based on the count of packets with L bit equal to 1 or 0 as detected by an intermediate observer might therefore be inaccurate.

Moreover, if endpoints and observer are managed by different entities, the entity managing the observer basically has no control of the mechanism whereby the endpoints declare a packet lost. Should this mechanism be removed or modified by the entity managing the endpoints, the mechanism for setting the L bit might not function any more and all types of packet loss measurements based on the L bit would then become unfeasible.

In view of the above, the Applicant has tackled the problem of providing methods for exchanging packets and performing a packet loss measurement on packets exchanged between two nodes of a packet-switched communication network, which overcome the aforesaid drawbacks.

In particular, the Applicant has tackled the problem of providing methods for exchanging packets and performing a packet loss measurement on packets exchanged between two nodes of a packet-switched communication network (for example—but not exclusively—two endpoints of a QUIC-based connection), which allow an observer placed between the two nodes to provide accurate packet loss measurements, including one-way measurements such as end-to-end measurements, upstream measurements and downstream measurements.

According to embodiments of the present invention, this problem is solved by a method wherein the packets exchanged by the two nodes comprise a first field (also termed herein after "marking field") and a second field (also termed herein after "reflected marking field"). Each one of the two nodes sets the value of the marking field of its outgoing packets, the value being alternately switched between a first and second value (e.g. 1 and 0) every N outgoing packets, N being a predefined integer. Besides, at least one of the nodes sets the value of the reflected marking field of its outgoing packets according to the values of the marking field of the incoming packets received from the other node.

This behavior of the two nodes results in the following exchange of packets.

A first node (e.g. the client of a QUIC-based connection) switches the value of the marking field in its outgoing packets to be transmitted to the second node (e.g. the server of the QUIC-based connection) every e.g. N=64 packets. The flow of outgoing packets transmitted by the first node is then in the form of a sequence of contiguous blocks of N=64 packets, which sequence comprises blocks of packets with marking field equal to 1 that alternate in time with blocks of packets with marking field equal to 0.

Since the second node behaves the same way, the first node also receives from the second node a sequence of contiguous blocks of incoming packets, which sequence comprises blocks of packets with marking field equal to 1 which alternate in time with blocks of packets with marking field equal to 0. If for a block no packet loss occurred, the number of incoming packets in that block as received by the first node is equal to N, otherwise it is lower than N.

While the first node is receiving such flow of incoming packets, it sets the value of the reflected marking field of its outgoing packets according to the values of the marking fields of the incoming packets received from the other node. For example, if the packet rate in the two directions is substantially the same, the first node may copy the value of the marking field of each incoming packet in the reflected marking field of a respective outgoing packet.

An observer placed between the two nodes may then detect and count the packets transmitted from the first node to the second node, which have their marking field and reflected marking field set to 0 or 1 as described above. Knowing a priori the value of N, the observer may use such packet counts to provide different types of packet loss measurements, including one-way measurements such as end-to-end measurements, upstream measurements or downstream measurements.

For instance, by counting the number of packets with marking field equal to 1 or 0 (e.g. by means of two separate counters), the observer may provide for each block a packet loss measurement from the first node to the observer.

Furthermore, the observer may also count the number of packets with reflected marking field equal to 1 or 0 (e.g. by means of two separate counters). Since the values of the reflected marking field in these packets outgoing the first node are related to the values of the marking field in the packets incoming at the first node from the second node, this number takes into account both possible packet losses occurred during transmission from the second node to the first node and possible packet losses occurred during transmission from the first node to the observer. The observer may then provide for each block a packet loss measurement from the second node to the first node and further to the observer.

The above measurements may be combined (possibly with similar measurements provided in the opposite direction, if the observer is bidirectional) to provide further types of measurements, such as end-to-end measurements and/or downstream measurements. Other types of measurements may be provided, if multiple observers may be implemented between the two nodes.

It may be appreciated that these packet loss measurement—in particular those based on or involving the reflected marking field—advantageously are very accurate.

Since, as discussed above, the first nodes sets the values of the reflected marking field in its outgoing packets according to the values of the marking field in the packets incoming from the second node, the number of packets with reflected marking field equal to 1 or 0 as detected by the observer is indicative of the number of packets transmitted by the second node which were actually lost to the effect that they were not received by the first node. Other events inducing the nodes to declare a packet lost (such as loss of the acknowledgement from the other node or reception of the acknowledgement after the time threshold is lapsed) have no impact on the value of the reflected marking field bit in the outgoing packets.

Moreover, the value of the reflected marking field is independent of the mechanism whereby the nodes declare a packet lost, or any other internal mechanism of the nodes which is provided for purposes other than enabling the observer to carry out the measurements according to the invention. Hence, advantageously, the entity performing the packet loss measurement has a higher control of the packet loss measurement implementation, since it relies only on dedicated mechanisms (namely, alternate marking and reflection) which are implemented at the nodes for the specific purpose of supporting such measurements.

According to a first aspect, the present invention provides a method for exchanging packets between two nodes of a packet-switched communication network, each packet comprising a marking field and a reflected marking field, the method comprising:

a) by each one of the two nodes, setting the value of the marking field in outgoing packets to be transmitted to the other node, such value being alternately switched between a first marking value and a second marking value every N outgoing packets, N being a predefined integer; and b) by at least one of the two nodes, while incoming packets are received from the other node, setting the value of the reflected marking field of the outgoing packets according to the value of the marking field of the incoming packets.

The incoming packets carry a marking signal consisting in the sequence of values of the marking field in the incoming packets and the outgoing packets carry a reflected marking signal consisting in the sequence of values of the reflected marking field in the outgoing packets, and step b) preferably comprises transmitting at least one cycle of the reflected marking signal in response to reception of at least one cycle of the marking signal.

Preferably, step b) comprises setting widths of the cycles of the reflected marking signal according to widths of cycles of the marking signal, the widths being expressed as a number of packets per cycle.

According to an embodiment, at step b) transmission of a cycle of the reflected marking signal comprises:

b1) when transmission of this cycle of the reflected marking signal is initiated, setting a width of this cycle of the reflected marking signal equal to the width of the last cycle of the marking signal whose reception has been completed; and b2) if, before transmission of this cycle of the reflected marking signal is terminated, reception of at least one further cycle of the marking signal is completed, updating the width of this cycle of the reflected marking signal based on the width of said at least one further cycle of said marking signal.

Preferably, at step b2) updating the width of this cycle of the reflected marking signal comprises setting the width of this cycle of said reflected marking signal equal to the average width of said at least one further cycle of said marking signal.

Preferably, step b) comprises transmitting R cycles of the reflected marking signal in response to reception of one cycle of the marking signal, R being an integer approximating the ratio between a transmission rate of the outgoing packets and a reception rate of the incoming packets.

In this case, the width of each one of the R cycles of the reflected marking signal is equal to the width of the one cycle of the marking signal, the widths being expressed as a number of packets per cycle.

Alternatively, step b) comprises transmitting one cycle of the reflected marking signal in response to reception of R cycles of the marking signal, R being an integer approximating the ratio between a reception rate of the incoming packets and a transmission rate of the outgoing packets.

In this case, the width of the one cycle of the reflected marking signal is equal to an average of the widths of the R cycles of the marking signal, the widths being expressed as a number of packets per cycle.

According to a second aspect, the present invention provides a method for performing a packet loss measurement on packets exchanged between two nodes of a packet-switched communication network, each packet comprising a marking field and a reflected marking field, the method comprising the steps of the method as set forth above and:

c) by an observer device, detecting the outgoing packets, providing a first parameter based on the value of the marking field in the detected outgoing packets and a second parameter based on the value of the reflected marking field in the detected outgoing packets, and performing the packet loss measurement based on the number N in combination with the first parameter and/or the second parameter.

According to a third aspect, the present invention provides a packet-switched communication network comprising two nodes for exchanging packets, each packet comprising a marking field and a reflected marking field, wherein:

each one of the two nodes is configured to set the value of the marking field in outgoing packets to be transmitted to the other node, the value being alternately switched between a first marking value and a second marking value every N outgoing packets, N being a predefined integer; and at least one of the two nodes is further configured to, while incoming packets are received from the other node, set the value of the reflected marking field of the outgoing packets according to the value of the marking field of the incoming packets.

Preferably, the packet-switched communication network further comprises an observer device configured to detect the outgoing packets, provide a first parameter based on the value of the marking field in the detected outgoing packets and a second parameter based on the value of the reflected marking field in the detected outgoing packets, and perform the packet loss measurement based on the number N in combination with the first parameter and/or the second parameter.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
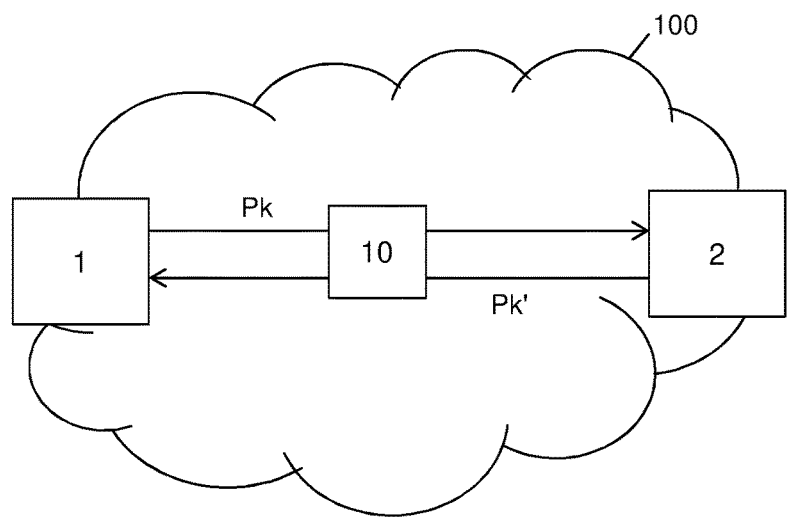
FIG. 1 schematically shows a packet-switched communication network configured to exchange packets so as to enable round-trip packet loss measurements according to an embodiment of the present invention.

FIG. 1 schematically shows a packet-switched communication network 100 configured to exchange packets so as to enable packet loss measurements according to embodiments of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, while the node 2 is configured to transmit packets Pk' to the node 1. The packets Pk may belong to a same packet flow (namely, they may all have a same source address and a same destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol, or TCP (Transmission Control Protocol).

Figure 2:
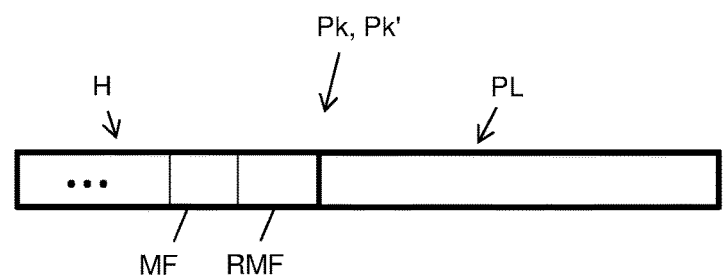
FIG. 2 schematically shows the structure of a packet exchanged in the communication network of FIG. 1, according to embodiments of the present invention.

As schematically depicted in FIG. 2, each packet Pk, Pk' comprises a payload PL and a header H (or more headers pertaining to different network layers, e.g. an IP header and a QUIC header). The payload PL comprises user data. The header H comprises packet forwarding information (not shown in FIG. 2), namely information allowing the nodes of the network 100 to properly handle the packets Pk, Pk' so that they reach their destination nodes.

According to embodiments of the present invention, each packet Pk, Pk' preferably comprises a first field (also termed herein after "marking field") MF and a second field (also termed herein after "reflected marking field") RMF. The marking field MF and reflected marking field RMF may be part of the same header H which comprises the packet forwarding information, as shown in FIG. 2. According to other embodiments, the marking field MF and reflected marking field RMF may be located in other parts of the packets Pk', Pk'. For instance, if the packets Pk, Pk' comprise other headers in addition to header H, the marking field MF and reflected marking field RMF may be included in any of such further headers. Assuming for example that the packets Pk, Pk' comprise an IP header H—comprising packet forwarding information—and a QUIC header, the marking field MF and reflected marking field RMF may be comprised in the QUIC header.

Each field MF, RMF comprises one or more bits. Each field MF, RMF may be set to anyone of a first marking value VA (e.g. 0 in case of a one-bit field MF, RMF) and a second marking value VB (e.g. 1 in case of a one-bit field MF, RMF).

According to embodiments of the present invention, each node 1, 2 preferably sets the value of the marking field MF of each outgoing packet Pk, Pk' to be transmitted to the other node 2, 1 so as to implement an alternate marking technique. In particular, each node 1, 2 preferably switches the value of the marking field MF between first and second marking value VA, VB every N outgoing packets Pk, Pk'. Preferably, the number N is a predefined integer. More preferably, the number N is a power of 2, for example $2^6$=64. The number N may be fixed or may be variable. In particular, according to a variant the node 1, 2 may vary the number N in a discrete set of integers, each integer of the set being a power of 2.

The alternate marking mechanisms implemented by the two nodes 1 and 2 are not necessarily reciprocally synchronized, namely each node 1, 2 autonomously decides when the marking value applicable to its outgoing packets Pk, Pk' shall be switched based on the number of its outgoing packets only, independently of the behavior of the other node 2, 1.

The flow of outgoing packets Pk, Pk' transmitted by each node 1, 2 is then in the form of a sequence of contiguous blocks of N packets, which sequence comprises blocks of N packets Pk, Pk' with marking field MF equal to VA which alternate in time with blocks of N packets Pk, Pk' with marking field MF equal to VB.

Since both the nodes 1, 2 behave the same way, each node 1, 2 also receives from the other node 2,1 a flow of incoming packets Pk', Pk in the form of a sequence of contiguous blocks of packets Pk', Pk, which sequence comprises blocks of packets Pk', Pk with marking field MF equal to VA which alternate in time with blocks of packets Pk', Pk with marking field MF equal to VB. If for a block no packet loss occurred, the number of incoming packets Pk', Pk in that block is equal to N, otherwise it is lower than N.

While the node 1, 2 is implementing the above alternate marking on its outgoing packets Pk, Pk' and receiving the flow of incoming packets Pk', Pk from the other node 2, 1, it also preferably implements a reflection mechanism whereby it sets the value of the reflected marking field RMF of its outgoing packets Pk, Pk' according to the values of the marking field MF of the incoming packets Pk, Pk'. Assuming that the packet transmission rates in the two directions are the same, the reflection carried out by each node 1, 2 may provide e.g. for copying the value VA or VB of the marking field MF of each incoming packet Pk', Pk into the reflected marking field RMF of a respective outgoing packet Pk, Pk'.

As mentioned above, such reflection is preferably carried out in parallel with the continuous, alternate setting of the marking field MF which the node 1, 2 carries out on the outgoing packets Pk, Pk'. Hence, the values of the marking field MF and reflected marking field RMF in each outgoing packet Pk, Pk' are unrelated, the first one being solely dictated by the alternate marking mechanism and the second one being instead exclusively dictated by the reflection mechanism.

Hence, the flow of outgoing packets Pk, Pk' transmitted by each node 1, 2 basically carries two unrelated signals, namely a marking signal MS consisting in the sequence of values of their marking field MF and a reflected marking signal RMS consisting in the sequence of values of their reflected marking field RMF. Both these signals are in the form of squared waves that switch between VA and VB.

Figure 3:
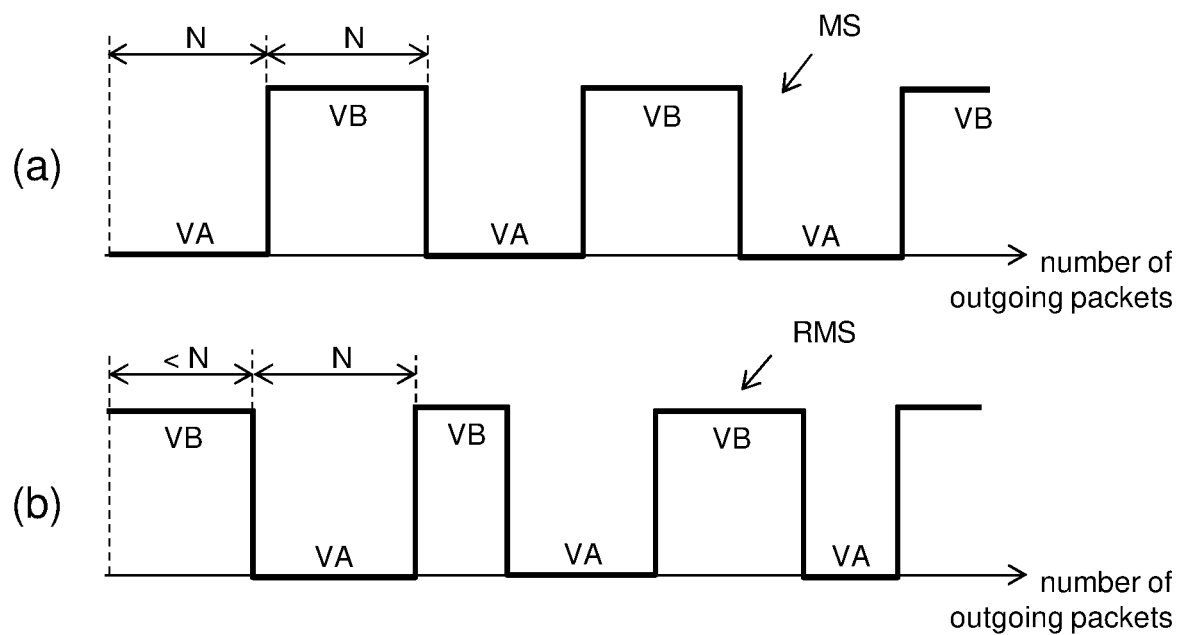
FIG. 3 shows an exemplary marking signal and reflected marking signal carried by a flow of packets outgoing a node which operates according to an embodiment of the present invention.

FIG. 3 is a diagram showing exemplary marking signal and reflected marking signal carried by the flow of outgoing packets Pk, Pk' as transmitted by the node 1, 2.

Since the node 1, 2 switches the value of the marking field MF every N outgoing packets, the marking signal MS is a periodic squared wave wherein the width of each cycle is equal to N, the width being expressed as a number of packets per cycle. Hence, the marking signal MS has with period 2N and duty cycle 50%.

Since, instead, the reflected marking field RMF is set according to the marking field MF of the incoming packets Pk', Pk, its features depend on the packet loss that such packets Pk', Pk experienced during transmission from the other node 2, 1 to node 1,2. In general, the reflected marking signal RMS is not periodic and the width of each cycle, expressed as a number of packets per cycle, depends on the number of packets Pk', Pk which were lost in the block corresponding to that cycle as transmitted from the other node 2, 1. By way of example, FIG. 3 shows a situation where some of the cycles have width equal to N (meaning that no packet Pk', Pk was lost in the corresponding block) and some other cycles have width lower than N (meaning that one or more packets Pk', Pk were lost in the corresponding block).

Figure 4:
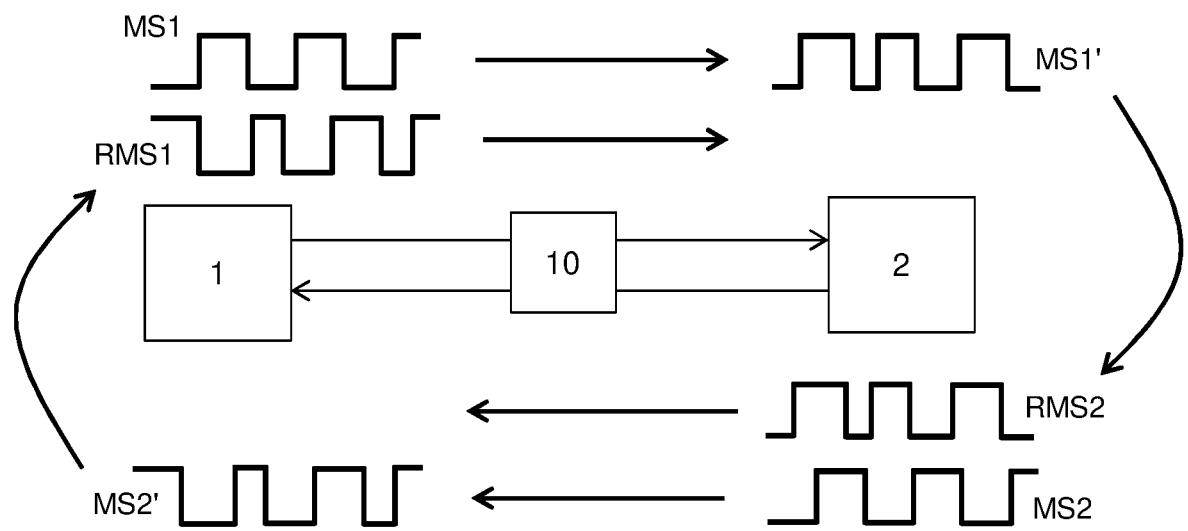
FIG. 4 schematically shows exemplary marking signals and reflected marking signals exchanged by two nodes which operate according to an embodiment of the present invention.

FIG. 4 shows exemplary marking signals and reflected marking signals transmitted by (namely, carried by the packet flow transmitted by) each node 1 and 2.

As depicted in FIG. 4, the node 1 transmits a squared wave marking signal MS1 with period 2N and duty cycle 50%. Due to packet loss undergone by packets Pk during transmission from node 1 to node 2, the marking signal MS1 may loose its periodicity, so that the marking signal MS1' as received by the node 2 appears distorted. The node 2 reflects such marking signal MS1' into a reflected marking signal RMS2 having the same shape (the packet rates in the two directions are assumed to be equal), which is then transmitted to the node 1.

In the meanwhile, the node 2 also transmits to the node 1 a squared wave marking signal MS2 with period 2N and duty cycle 50%. Due to packet loss undergone by packets Pk' during transmission from node 2 to node 1, the marking signal MS2 may loose its periodicity, so that the marking signal MS2' as received by the node 1 appears distorted. The node 1 reflects such marking signal MS2' into a reflected marking signal RMS1 having the same shape (the packet rates in the two directions are assumed to be equal), which is then transmitted to the node 2.

An observer 10 placed between the nodes 1 and 2 may then detect the flow of packets Pk transmitted from node 1 to node 2 and/or the flow of packets Pk' transmitted from node 2 to node 1 and, based on the marking signal MS and reflected marking signal RMS carried by such flows, provide different types of packet loss measurements, including one-way measurements such as end-to-end measurements, upstream measurements or downstream measurements.

Figure 5:
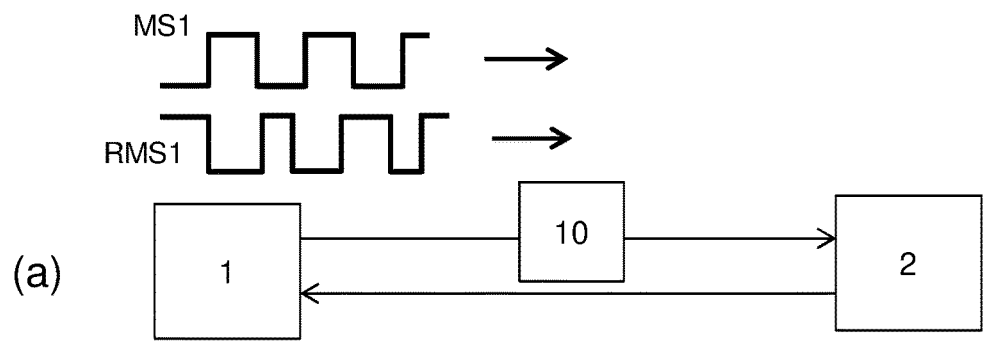
FIG. 5 shows exemplary measurements which may be carried out by an intermediate observer placed between the two nodes of FIG. 4.
Figure 5:
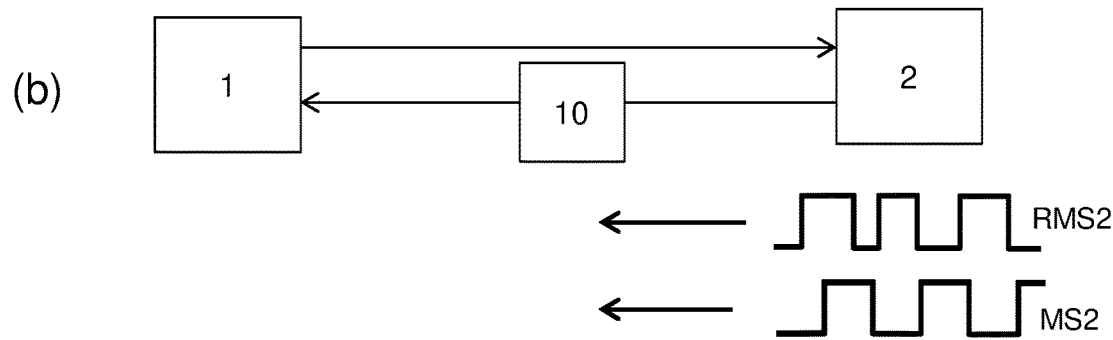
Figure 5:
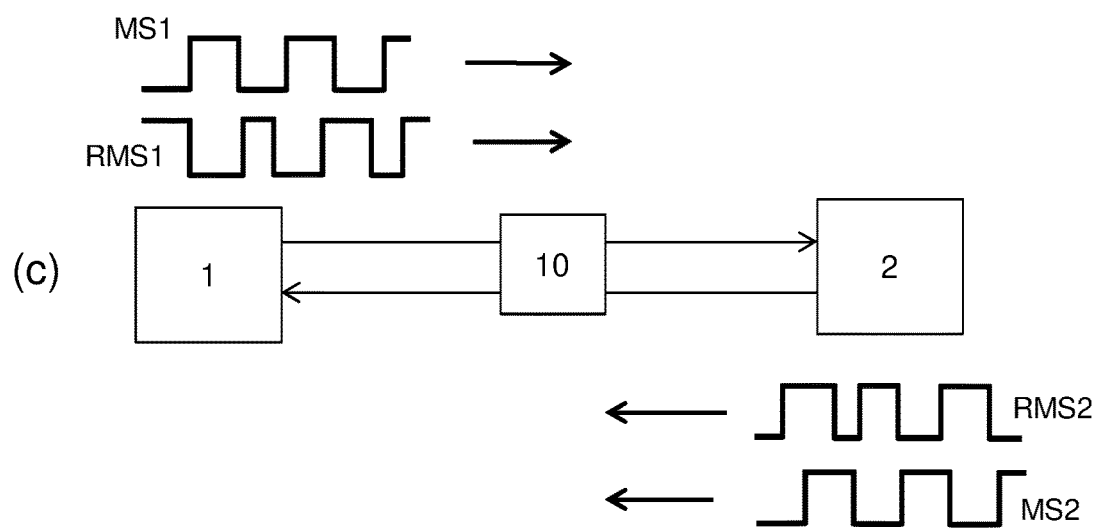

FIG. 5 shows three exemplary cases where three different types of observers are used.

FIG. 5(*a*) shows a case where the observer 10 is capable of detecting only the flow of packets Pk transmitted from node 1 to node 2, and then only the marking signal MS1 and reflected marking signal RMS1. The observer 10 may accordingly provide packet loss measurements based on such signals only.

For instance, the observer 10 may implement two couples of counters, namely a first couple of counters $CA^M$, $CB^M$ counting the number of packets Pk whose marking field MF is equal to VA and VB, respectively; and a second couple of counters $CA^{RM}$, $CB^{RM}$ counting the number of packets Pk whose reflected marking field RMF is equal to VA and VB, respectively.

By knowing a priori the value of N and using the first couple of counters $CA^M$, $CB^M$, the observer 10 may provide a packet loss measurement PL(1→10) from transmitting node 1 to observer 10, as described e.g. by WO 2010/072251 in the name of the same Applicant.

Further, by knowing a priori the value of N and using the second couple of counters $CA^{RM}$, $CB^{RM}$, the observer 10 may provide a packet loss measurement PL(2→1→10) from node 2 to node 1 and further to observer 10. Since the value of the reflected marking field RMF in the outgoing packets Pk is obtained by reflection at the node 1 of the marking field MF in packets Pk' incoming from node 2, the counters $CA^{RM}$, $CB^{RM}$ indeed take into account both possible packet losses on packets Pk' occurred during transmission from node 2 to node 1 and possible packet losses occurred during transmission of packets Pk from node 1 to observer 10. Also in this case, the measurement may be carried out according to WO 2010/072251 in the name of the same Applicant.

FIG. 5(*b*) shows a case where the observer 10 is capable of detecting only the flow of packets Pk' transmitted from node 2 to node 1, and then only the marking signal MS2 and reflected marking signal RMS2. The observer 10 may accordingly provide packet loss measurements based on such signals only.

The operation may be the same as described above, namely the observer 10 may implement two couples of counters (a first couple of counters counting the number of packets Pk' whose marking field MF is equal to VA and VB respectively; and a second couple of counters counting the number of packets Pk' whose reflected marking field RMF is equal to VA and VB respectively), and use the values of such counters e.g. as described by WO 2010/072251 in the name of the same Applicant to provide a packet loss measurement PL(2→10) from transmitting node 2 to observer 10 and/or a packet loss measurement PL(1→2→10) from node 1 to node 2 and further to observer 10.

FIG. 5(*c*) shows a case where the observer 10 is capable of detecting both the flow of packets Pk and the flow of packets Pk'. The observer 10 may accordingly provide all the packet loss measurements described above in connection with FIGS. 5(*a*) and 5(*b*). Such measurements may be combined to provide further packet loss measurements.

For example, half-round trip measurements (namely, from observer 10 to node 1 or 2 and back to observer 10) on the two sides of the observer 10 may be calculated by the observer 10 as:

PL(10→1→10)=PL(2→1→10)−PL(2→10); and

PL(10→2→10)=PL(1→2→10)−PL(1→10).

Also end-to-end measurements (namely, from the node 1 to the node 2 and vice versa) may be calculated by the observer 10 as:

PL(2→1)=PL(2→1→10)−PL(1→10); and

PL(1→2)=PL(1→2→10)−PL(2→10).

Also downstream measurements (namely, from the observer 10 to the receiving node 1 or 2) may be calculated by the observer 10 as:

PL(10→2)=PL(1→2)−PL(1→10); and

PL(10→1)=PL(2→1)−PL(2→10).

It may be appreciated that the observer 10 may be implemented at the node 1 or at the node 2. In this case, the above packet loss measurements exclusively based on the marking field MF are end-to-end measurements, while the packet loss measurements exclusively based on the reflected marking field RMF are round-trip measurements.

In any case, it may be appreciated that these packet loss measurements—in particular, those based on or involving the values of the reflected marking field RMF in the packets Pk and/or Pk'—advantageously are very accurate.

Since, as discussed above, at each node 1, 2 the value of the reflected marking field RMF in the outgoing packets Pk, Pk' is set according to the values of the marking field MF in packets Pk', Pk incoming from the other node 2, 1, the number of packets Pk, Pk' with reflected marking field RMF equal to VA or VB as detected by the observer 10 is indicative of the number of packets Pk', Pk transmitted by the other node 2, 1 which were actually lost. Other events inducing the nodes 1 and 2 to declare a packet lost (such as loss of the acknowledgement from the other node or reception of the acknowledgement after the time threshold is lapsed) have no impact on the value of the reflected marking field RMF in the outgoing packets Pk, Pk'.

Moreover, the value of the reflected marking field RMF is independent of any mechanism (e.g. the above described mechanism provided by the QUIC protocol) whereby the nodes 1 and 2 declare a packet Pk or Pk' lost, or any other internal mechanism of the nodes 1 and 2 which is provided for purposes other than enabling the observer 10 to carry out the above described measurements. Hence, advantageously, the entity performing the packet loss measurements has a higher control of the measurement implementation, since it relies only on dedicated mechanisms (namely, alternate marking and reflection) which are implemented at the nodes 1, 2 for the specific purpose of supporting such measurements.

In the above description, it was assumed that the packet transmission rate in the two directions is substantially the same. This allows implementing the reflection mechanism e.g. by copying the value of the marking field MF of each incoming packet Pk', Pk into the reflected marking field RMF of a corresponding outgoing packet Pk', Pk'.

In general, however, the packet transmission rates in the two directions may be very different from each other. For example, on a QUIC-based connection, the packet transmission rate of the server may be much higher than the packet transmission rate of the client (e.g. from 2:1 to 10:1). In this case, the reflection mechanism at the two nodes becomes critical. At the node with lower packet transmission rate, indeed, incoming packets to be reflected would indefinitely accumulate. Besides, at the node with higher packet transmission rate the reflection mechanism would be discontinuous. In any case, the reflection mechanism could not operate properly and no packet loss measurement could be performed.

Figure 6:
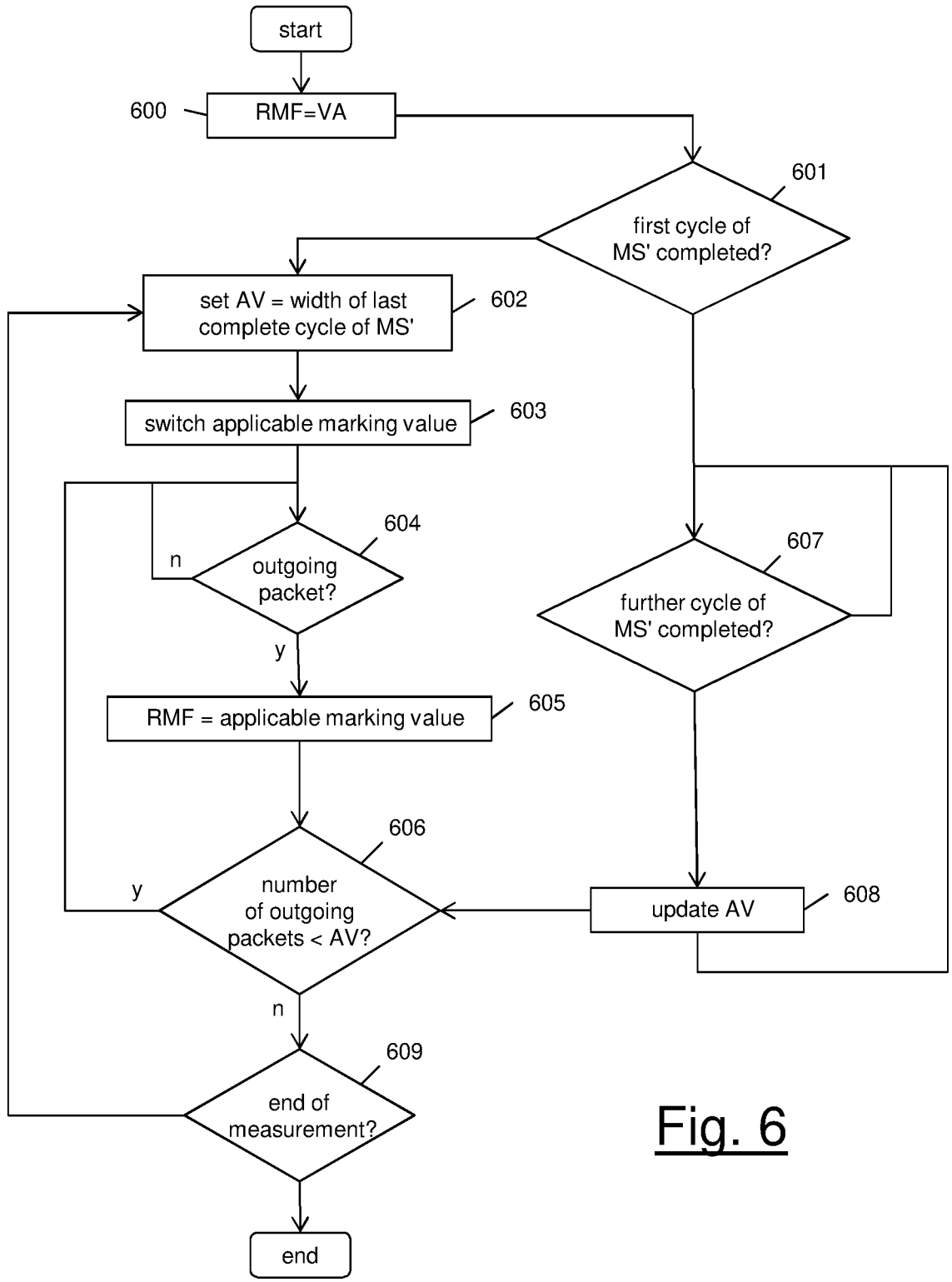
FIG. 6 is a flow chart of the reflection mechanism performed by each node according to an advantageous embodiment of the present invention.

The Applicant has realized that the above drawbacks may be solved by implementing the reflection step at each node 1, 2 according to the flow chart shown in FIG. 6.

As depicted in FIG. 6, when a packet loss measurement is started, the node 1, 2 initially sets the value of the reflected marking field RMF in the outgoing packets Pk, Pk' to an initial value (e.g. VA) (step 600).

When the measurement session is started, both the nodes 1 and 2 start setting the marking field MF of their outgoing packets Pk, Pk' according to the alternate marking technique, as described above.

Hence, each node 1, 2 starts receiving a flow of incoming packets Pk', Pk' from the other node, which carries a marking signal MS'.

When the node 1, 2 completes reception of the first cycle of the marking signal MS' (step 601), it preferably sets an average cycle width AV, expressed as a number of packets per cycle, equal to the width, expressed as a number of packets per cycle, of the last cycle of the marking signal MS' whose reception has been completed (namely the width N0 of the first cycle, at the first iteration) (step 602).

Completion of the reception of the first cycle of the marking signal MS' may be determined by the node 1, 2 at step 601 as the first change of value in the marking field MF of the incoming packets Pk', Pk after start of the measurement session. Further details on implementation of step 601 will be provided herein below.

The node 1, 2 then switches the marking value applicable to the reflected marking field RMF on the outgoing packets Pk, Pk' that will have to be transmitted from that moment on (step 603).

Then, for each outgoing packet Pk, Pk' to be transmitted (step 604), the node 1, 2 preferably sets its reflected marking field RMF to the currently applicable marking value determined at step 603 (step 605). As long as the number of outgoing packets Pk, Pk' whose reflected marking field RMF has been set equal to the applicable marking value since the last switching step 603 is lower than the average cycle width AV (step 606), the node 1, 2 preferably continues using the currently applicably marking value, thereby transmitting a cycle of the reflected marking signal RMS.

When the node 1, 2 instead determines that such number has become equal to the average cycle width AV, the node 1, 2 preferably terminates the current cycle of the reflected marking signal RMS and starts a new one. Starting a new cycle of the reflected marking signal RMS comprises reverting to steps 602 and 603, namely setting the value of the average cycle width AV equal to the width of the last cycle of the marking signal MS' whose reception has been completed and switching again the applicable marking value. The node 1, 2 then repeats the loop 604-605-606 to transmit the new cycle of the reflected marking signal RMS.

The above steps are repeated cyclically, until the end of the measurement session (step 609).

While the above steps are carried out, the node 1, 2 continues receiving the marking signal MS' from the other node 2, 1. During each iteration of the loop 604-605-606, the node 1, 2 preferably updates the value of the average cycle width AV used at the checks 606 accordingly.

In particular, as described above at each iteration of step 602 initiating a new cycle of the reflected marking signal RMS the node 1, 2 initially sets the value of AV equal to the width of the last cycle of the marking signal MS' whose reception has been completed. If, during the corresponding iteration of the loop 604-605-606 the node 1, 2 completes reception of a further cycle of the marking signal MS' (step 607), the node 1, 2 preferably updates the value of the average cycle width AV based on the width of such further cycle (step 608).

Completion of the reception of a cycle of the marking signal MS' may be determined by the node 1, 2 at step 607 as a change of value in the marking field MF of the incoming packets Pk', Pk. Further details on implementation of step 607 will be provided herein below.

Step 608 preferably comprises updating the value of the average cycle width AV by averaging its initial value as set at step 602 with the width of the further received cycle. Such averaging is preferably recursively repeated each time the reception of a further cycle of the marking signal MS' is completed before the end of the iteration of the loop 604-605-606.

Hence, if at step 602 the average cycle width AV is initially set to the width N0 of the last cycle of the marking signal MS' whose reception has been completed and, during the corresponding iteration of the loop 604-605-606, the node 1, 2 completes reception of a first further cycle of width N1 (step 607), then AV is updated as AV=(N0+N1)/2 (step 608). If, during the same iteration of the loop 604-605-606, the node 1, 2 completes reception of a second further cycle of width N2 (step 607), then AV is updated as AV=(N0+N1+N2)/3 (step 608). And so on, until the iteration of the loop 604-605-606 is terminated (check of step 606 negative) and the node 1, 2 reverts to step 602, thereby setting a new value for AV.

Such mechanism for setting AV at the beginning of each iteration of the loop 604-605-606 and updating its value during the same iteration advantageously allows providing a reflection mechanism which may properly operate also when the packet transmission rates in the two directions are different.

Figure 7A:
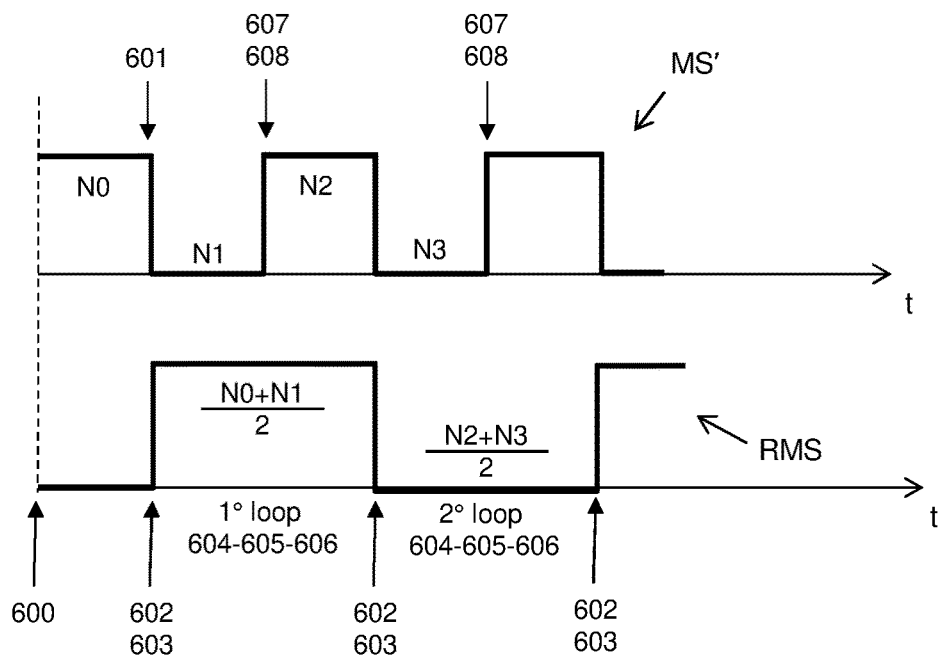
FIGS. 7(a) and 7(b) show an exemplary incoming marking signal and outgoing marking signals provided by a node which operates according to the flow chart of FIG. 6.
Figure 7B:
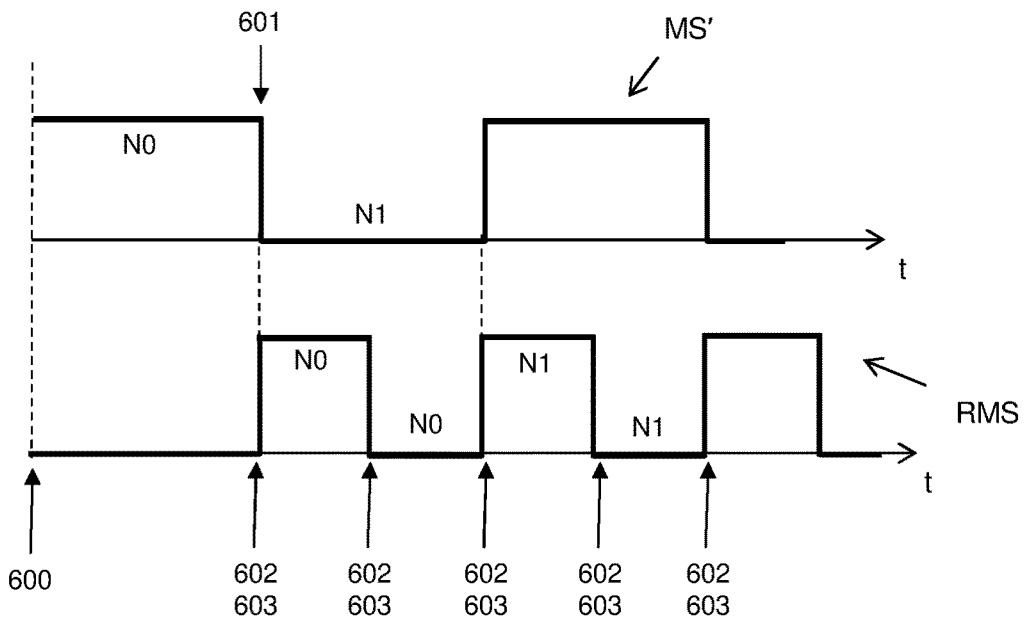

FIGS. 7(*a*) and 7(*b*) show an exemplary marking signal MS' received at the node 1, 2 and the reflected marking signal RMS provided by the node 1, 2 as a result of execution of the flow chart of FIG. 6, in two different scenarios. The abscissa axis indicates time.

FIG. 7(*a*) illustrates a case wherein the packet transmission rate of the node 1, 2 is lower than the packet transmission rate of the other node 2, 1. For example, it is assumed that the packet transmission rate of the node 1, 2 is half the packet transmission rate of the other node 2, 1. Hence, the rate of packets Pk', Pk incoming at the node 1, 2 is twice the rate of packets Pk, Pk' outgoing the node 1, 2. The incoming packets Pk', Pk carry a marking signal MS'. The widths of the cycles of the marking signal MS' (expressed in number of incoming packets) are indicated as N0, N1, N2, N3, etc.

When the measurement session is started, the node 1, 2 initially sets the value of the reflected marking field RMF in the outgoing packets Pk, Pk' to an initial value VA or VB (step 600). When the node 1, 2 completes reception of the first cycle of the marking signal MS' (step 601), it sets the average cycle width AV equal to its width N0 (step 602) and switches the applicable marking value (step 603).

Then, the node 1, 2 starts setting the reflected marking field RMF to the currently applicable marking value (loop 604-605-606). Since the incoming packet rate is higher than the outgoing packet rate, reception of the second cycle of the marking signal MS' of width N1 (step 607) is completed before the number of outgoing packets whose reflected marking field RMF has been set equal to the currently applicable marking value reaches AV=N0. Hence, the node updates the value of AV as AV=(N0+N1)/2 (step 608).

When the number of outgoing packets whose reflected marking field RMF has been set equal to the current applicable marking value reaches AV=(N0+N1)/2, the node 1, 2 terminates the first cycle of the reflected marking signal RMS and starts a second cycle, by setting the average cycle width AV equal to the width N2 of the last cycle of the marking signal MS' whose reception has been completed (step 602) and switching the applicable marking value (step 603).

Then, the node 1, 2 starts setting the reflected marking field RMF to the currently applicable marking value (loop 604-605-606). Since the incoming packet rate is again higher than the outgoing packet rate, reception of the fourth cycle of the marking signal MS' of width N3 (step 607) is completed before the number of outgoing packets whose reflected marking field RMF has been set equal to the currently applicable marking value reaches AV=N2. Hence, the node updates the value of AV as AV=(N2+N3)/2 (step 608).

When the number of outgoing packets whose reflected marking field RMF has been set equal to the current applicable marking value reaches AV=(N2+N3)/2, the node 1, 2 terminates the second cycle of the reflected marking signal RMS as described above. And so on.

Hence, the node 1, 2 basically "merges" R consecutive cycles of the received marking signal MS' into a single cycle of the reflected marking signal RMS, whose width is the average of the widths of the R merged cycles. The number R of merged cycles is basically an integer approximating the ratio between the packet rates in the two directions (R=2 in the exemplary situation of FIG. 7(*a*)). Hence, the time duration of a cycle of the reflected marking signal RMS is basically equal to the cumulative duration of the R merged cycles of the received marking signal MS'. This advantageously allows avoiding an indefinite accumulation of the values of the reflected marking field RMF in the incoming packets Pk', Pk to be reflected at the node 1, 2, which would congest the reflection mechanism at the node 1, 2 and prevent the packet loss measurement to operate properly.

FIG. 7(*b*) illustrates a case wherein the packet transmission rate of the node 1, 2 is higher than the packet transmission rate of the other node 2, 1. For example, it is assumed that the packet transmission rate of the node 1, 2 is twice the packet transmission rate of the other node 2, 1. Hence, the rate of packets Pk', Pk incoming at the node 1, 2 is half the rate of packets Pk, Pk' outgoing the node 1, 2. The incoming packets Pk', Pk carry a marking signal MS'. The widths of the cycles of the marking signal MS' (expressed in number of incoming packets) are indicated as N0, N1, N2, N3, etc.

When the measurement session is started, the node 1, 2 initially sets the value of the reflected marking field RMF in the outgoing packets Pk, Pk' to an initial value VA or VB (step 600). When the node 1, 2 completes reception of the first cycle of the marking signal MS' (step 601), it sets the average cycle width AV equal to its width N0 (step 602) and switches the applicable marking value (step 603).

Then, the node 1, 2 starts setting the reflected marking field RMF to the currently applicable marking value (loop 604-605-606). Since the incoming packet rate is lower than the outgoing packet rate, the node 1, 2 completes reception of no cycle of the marking signal MS' before the number of outgoing packets whose reflected marking field RMF has been set equal to the currently applicable marking value reaches AV=N0. Hence, the node 1, 2 does not perform any update of the value of AV=N0 during transmission of the first cycle of the reflected marking signal RMS.

When the number of outgoing packets whose reflected marking field RMF has been set equal to the current applicable marking value reaches AV=N0, the node 1, 2 terminates the first cycle of the reflected marking signal RMS and starts a second cycle by setting the average cycle width AV equal to the width of the last cycle of the marking signal MS' whose reception has been completed, which is still N0 (step 602), and switching the applicable marking value (step 603).

Then, the node 1, 2 starts setting the reflected marking field RMF to the currently applicable marking value (loop 604-605-606). Again, the node 1, 2 completes reception of no cycle of the marking signal MS' before the number of outgoing packets whose reflected marking field RMF has been set equal to the currently applicable marking value reaches AV=N0. Hence, the node 1, 2 does not perform any update of the value of AV=N0 also during transmission of the second cycle of the reflected marking signal RMS.

Then the node 1, 2 terminates the second cycle of the reflected marking signal RMS and starts a third cycle by setting the average cycle width AV equal to the width N1 of the last cycle of the marking signal MS' whose reception has been completed (step 602) and switching the applicable marking value (step 603).

Also during the third cycle, the node 1, 2 completes reception of no cycle of the marking signal MS' before the number of outgoing packets whose reflected marking field RMF has been set equal to the currently applicable marking value reaches AV=N1. Hence, the node 1, 2 does not perform any update of the value of AV=N1 also during transmission of the third cycle of the reflected marking signal RMS.

Then the node 1, 2 terminates the third cycle of the reflected marking signal RMS and starts a fourth cycle by setting the average cycle width AV equal to the width of the last cycle of the marking signal MS' whose reception has been completed, which is again N1 (step 602), and switching the applicable marking value (step 603).

Also during the fourth cycle, the node 1, 2 completes reception of no cycle of the marking signal MS' before the number of outgoing packets whose reflected marking field RMF has been set equal to the currently applicable marking value reaches AV=N1. Hence, the node 1, 2 does not perform any update of the value of AV=N1 also during transmission of the fourth cycle of the reflected marking signal RMS.

The node 1, 2 then terminates the fourth cycle of the reflected marking signal RMS as described above (steps 602, 603). And so on.

Hence, the node 1, 2 basically "replicates" each cycle of the marking signal MS' into a number R of cycles of the reflected marking signal RMS, whose widths, in terms of the number of packets, are all equal to the width of the received cycle. The number R of replicated cycles is basically an integer approximating the ratio between the packet rates in the two directions (R=2 in the exemplary situation of FIG.

7(b)). Hence, the cumulative time duration of the R replicated cycles of the reflected marking signal RMS is basically equal to the duration of the corresponding cycle of the received marking signal MS'. This advantageously allows avoiding interruptions in the reflection mechanism, which would prevent the packet loss measurement from properly operating.

Also when reflection is implemented according to the algorithm of FIG. 6, the observer 10 may perform packet loss measurements based on the marking signal MS and reflected marking signal RMS transmitted in either direction (see FIGS. 5(a) and 5(b)) or in both directions (see FIG. 5(c)). Since the packet transmission rates in the two directions are different, in order to combine packet loss measurements derived from signals transmitted in opposite directions, the observer 10 preferably calculates their average values before combining them. This guarantees that the combined packet loss measurements are consistent, in spite of the different packet transmission rates in the two directions.

It shall further be noticed that packet loss measurements based on the values of the reflected marking field RMF exhibit a delay relative to those based on the value of the marking field MF, due to the delay introduced by the reflection mechanism itself which starts only after reception of the first cycle of the marking signal RM' is completed. In case of a packet loss measurement obtained by using both signals, such delay introduces an inaccuracy in the measurement result relating to the first measurement period. Hence, such measurement is preferably discarded.

At steps 601 and 607, the node 1, 2 completes reception of a cycle of the marking signal MS'. At both steps, the node 1, 2 may conclude that reception of a cycle of the marking signal MS' is completed when it detects a change of the marking value comprised in the marking field MF of the incoming packets Pk', Pk.

However, reception sequence errors may occur involving the incoming packets Pk', Pk at the boundary between two cycles of the marking signal MS.

In order to manage such errors, the node 1, 2 may wait reception of a predefined number of incoming packets Pk', Pk (e.g. 5 incoming packets) having the next marking value, before concluding that reception of the preceding cycle is completed.

Otherwise, the node 1, 2 may conclude that reception of a cycle of the marking signal MS' is completed when the first incoming packet Pk', Pk with the next marking value is received. This allows avoiding introducing delays in the reflection mechanism. On the other side, however, late incoming packets Pk', Pk having the preceding marking value would be counted as part of the next cycle of the marking signal MS', whose width would then be increased and could also be higher than N. If N is not fixed (e.g. it may be varied in a discrete range comprising different powers of 2), the observer 10 is preferably provided with a threshold mechanism allowing it to determine—for each cycle of the reflected marking signal RMS whose width is higher than N—whether it comprises reflection of late packets Pk', Pk or whether the number N has been increased, e.g. increased to the higher power of 2.

According to a first variant of the algorithm in FIG. 6, the check at step 606 provides for comparing the number of outgoing packets whose reflected marking field RMF has been set equal to the applicable marking value with the value of AV rounded to the closest integer. Due to the updates of the value of AV (steps 607-608), the average of the widths of relevant cycles of the marking signal MS' performed at step 608 may indeed provide an non integer number.

Further, since rounding the value of AV may introduce an error, according to another variant such error may be minimized as follows.

A variable RE is initialized to 0 and, at the end of each iteration of the loop 604-605-606, it is updated as RE=round (AV+RE)−AV. This value of RE will then be used at the checks 606 of the next iteration of the loop 604-605-606, where the number of outgoing packets whose reflected marking field RMF has been set equal to the applicable marking value will be compared with the rounded value of AV plus the value of RE.

According to still another variant, step 608 whereby the value of the average cycle width AV is updated each time the reception of a cycle of the marking signal MS' is completed preferably provides for excluding from the average calculation the width of the last cycle of the marking signal MS' whose reception was completed during transmission of the last cycle of the reflected marking signal RMS, if that width was already used for updating the value of AV during transmission of the last cycle of the reflected marking signal RMS. This is preferably performed for every iteration of the loop 604-605-606 except the first one.

Also according to the above described variants, the packet loss measurements based on or involving the values of the reflected marking field RMF in the outgoing packets Pk, Pk' advantageously are very accurate.

Also according to these variants, indeed, at each node 1, 2 the value of the reflected marking field RMF in the outgoing packets Pk, Pk' is set according to the values of the marking field MF in packets Pk', Pk incoming from the other node 2, 1. Hence, the number of packets Pk, Pk' with reflected marking field RMF equal to VA or VB as detected by the observer 10 is indicative of the number of packets Pk', Pk transmitted by the other node 2, 1 which were actually lost. Other events inducing the nodes 1 and 2 to declare a packet lost (such as loss of the acknowledgement from the other node or reception of the acknowledgement after the time threshold is lapsed) have no impact on the value of the reflected marking field RMF in the outgoing packets Pk, Pk'.

Moreover, the value of the reflected marking field RMF is independent of any mechanism (e.g. the above described mechanism provided by the QUIC protocol) whereby the nodes 1 and 2 declare a packet Pk or Pk' lost, or any other internal mechanism of the nodes 1 and 2 which is under the exclusive control of their managing entity. Hence, advantageously, the entity managing the observer 10 has a full control of the packet loss measurement implementation.

The Applicant has estimated that the described method provides accurate packet loss measurements especially when the packet loss rate does not exceed 20-25% in both directions. Since in most types of connections (in particular in QUIC-based connections) transmission of packets is stopped when the packet loss rate exceeds 30%, the described method is therefore capable of properly operating in all contexts where a packet loss measurement is feasible and meaningful.

The invention claimed is:

1. A method for exchanging packets between two nodes of a packet-switched communication network, each of the packets comprising a marking field and a reflected marking field, said method comprising:
   a) by each one of said two nodes, setting a value of said marking field in outgoing packets to be transmitted to the other node of said two nodes, said value being alternately switched between a first marking value and a second marking value every N outgoing packets, N being a predefined integer; and b) by at least one of said two nodes, which set the value of said marking field between the first marking value and the second marking value in the outgoing packets, while incoming packets whose marking fields have been set between the first marking value and the second marking value by the other node are received from the other node, setting the value of said reflected marking field of said outgoing packets, which are different from the incoming packets, according to the value of the marking field of said incoming packets whose marking fields have been set between the first marking value and the second marking value by the other node such that values of the marking field and the reflected marking field in each of the outgoing packets are unrelated.

2. The method according to claim 1, wherein
said incoming packets carry a marking signal consisting of a sequence of values of said marking field in said incoming packets,
said outgoing packets carry a reflected marking signal consisting of a sequence of values of said reflected marking field in said outgoing packets, and
step b) comprises transmitting at least one cycle of said reflected marking signal in response to reception of at least one cycle of said marking signal.

3. The method according to claim 2, wherein
step b) comprises setting widths of cycles of said reflected marking signal according to widths of cycles of said marking signal, and
said widths are expressed as a number of packets per cycle.

4. The method according to claim 3, wherein, at step b) transmission of a cycle of said reflected marking signal comprises:
b1) when transmission of said cycle of said reflected marking signal is initiated, setting a width of said cycle of said reflected marking signal equal to a width of the last cycle of said marking signal whose reception has been completed; and
b2) if, before transmission of said cycle of said reflected marking signal is terminated, reception of at least one further cycle of said marking signal is completed, updating the width of said cycle of said reflected marking signal based on a width of said at least one further cycle of said marking signal.

5. The method according to claim 4, wherein, at step b2), said updating comprises setting the width of said cycle of said reflected marking signal equal to an average width of said at least one further cycle of said marking signal.

6. The method according to claim 4, wherein
said step b) comprises transmitting R cycles of said reflected marking signal in response to reception of one cycle of said marking signal, and
R is an integer approximating a ratio between a transmission rate of said outgoing packets and a reception rate of said incoming packets.

7. The method according to claim 6, wherein
a width of each one of said R cycles of said reflected marking signal is equal to a width of said one cycle of said marking signal, and
said widths are expressed as a number of packets per cycle.

8. The method according to claim 4, wherein
said step b) comprises transmitting one cycle of said reflected marking signal in response to reception of R cycles of said marking signal, and
R is an integer approximating a ratio between a reception rate of said incoming packets and a transmission rate of said outgoing packets.

9. The method according to claim 8, wherein
a width of said one cycle of said reflected marking signal is equal to an average of widths of said R cycles of said marking signal, and
said widths are expressed as a number of packets per cycle.

10. A method for performing a packet loss measurement on packets exchanged between two nodes of a packet-switched communication network, each packet comprising a marking field and a reflected marking field, said method comprising the steps of the method according to claim 1 and:
c) by an observer device disposed between the two nodes on a path of the packets exchanged by the two nodes:
detecting said outgoing packets,
providing a first parameter based on the value of said marking field in said detected outgoing packets and a second parameter based on the value of said reflected marking field in said detected outgoing packets, and
performing said packet loss measurement based on said number N in combination with said first parameter and/or said second parameter.

11. The method according to claim 1, wherein the at least one of said two nodes, which set the value of said marking field between the first marking value and the second marking value in the outgoing packets, sets the value of said reflected marking field of said outgoing packets to be the value of the marking field of said incoming packets whose marking fields have been set between the first marking value and the second marking value by the other node.

12. A packet-switched communication network, comprising:
two nodes for exchanging packets, each of the packets comprising a marking field and a reflected marking field, wherein:
each one of said two nodes is configured to set a value of said marking field in outgoing packets to be transmitted to the other node of said two nodes, said value being alternately switched between a first marking value and a second marking value every N outgoing packets, N being a predefined integer; and
at least one of said two nodes, which set the value of said marking field between the first marking value and the second marking value in the outgoing packets, is further configured to, while incoming packets whose marking fields have been set between the first marking value and the second marking value by the other node are received from the other node, set the value of said reflected marking field of said outgoing packets, which are different from the incoming packets, according to the value of the marking field of said incoming packets whose marking fields have been set between the first marking value and the second marking value by the other node such that values of the marking field and the reflected marking field in each of the outgoing packets are unrelated.

13. The packet-switched communication network according to claim 12, further comprising:
an observer device disposed between the two nodes on a path of the packets exchanged by the two nodes and configured to:
detect said outgoing packets,
provide a first parameter based on the value of said marking field in said detected outgoing packets and a second parameter based on the value of said reflected marking field in said detected outgoing packets, and perform said packet loss measurement based on said number N in combination with said first parameter and/or said second parameter.

14. The packet-switched communication network according to claim 12, wherein the at least one of said two nodes, which set the value of said marking field between the first marking value and the second marking value in the outgoing packets, is configured to set the value of said reflected marking field of said outgoing packets to be the value of the marking field of said incoming packets whose marking fields have been set between the first marking value and the second marking value by the other node.

* * * * *